US012131000B2

United States Patent
Gelfenbeyn et al.

(10) Patent No.: US 12,131,000 B2
(45) Date of Patent: Oct. 29, 2024

(54) PROVIDING A NETWORK FOR SHARING AND VIEWING ARTIFICIAL INTELLIGENCE CHARACTERS

(71) Applicant: Theai, Inc., Mountain View, CA (US)

(72) Inventors: Ilya Gelfenbeyn, Palo Alto, CA (US); Mikhail Ermolenko, Mountain View, CA (US); Kylan Gibbs, San Francisco, CA (US); Evgenii Shingarev, Mountain View, CA (US)

(73) Assignee: Theai, Inc., Mountain View, CA (US)

( * ) Notice: Subject to any disclaimer, the term of this patent is extended or adjusted under 35 U.S.C. 154(b) by 26 days.

(21) Appl. No.: 18/401,383

(22) Filed: Dec. 30, 2023

(65) Prior Publication Data

US 2024/0220067 A1    Jul. 4, 2024

Related U.S. Application Data

(60) Provisional application No. 63/436,123, filed on Dec. 30, 2022.

(51) Int. Cl.
*G06F 3/04815* (2022.01)
*G06T 13/40* (2011.01)
*G10L 15/22* (2006.01)

(52) U.S. Cl.
CPC .......... *G06F 3/04815* (2013.01); *G06T 13/40* (2013.01); *G10L 15/22* (2013.01)

(58) Field of Classification Search
CPC ...... G06F 3/04815; G06T 13/40; G10L 15/22
See application file for complete search history.

(56) References Cited

U.S. PATENT DOCUMENTS

| 2003/0193504 A1* | 10/2003 | Cook | G06T 13/40 |
| | | | 345/473 |
| 2007/0021200 A1* | 1/2007 | Fox | A63F 13/10 |
| | | | 463/30 |

(Continued)

OTHER PUBLICATIONS

Westera et al. Artificial intelligence moving serious gaming: Presenting reusable game AI components. Education and Information Technologies, vol. 25, Jul. 20, 2019 (Jul. 30, 2019), pp. 351-380 [online], [retrieved on Mar. 18, 2024]. Retrieved from the internet, entire document, especially Abstract; Fig. 1; p. 355-356, 363.

*Primary Examiner* — Cao H Nguyen
(74) *Attorney, Agent, or Firm* — Georgiy L Khayet

(57) ABSTRACT

Systems and methods for providing a network for generating, sharing, and viewing artificial intelligence (AI) characters are provided. An example method includes providing a web-based interface enabling a user to generate and modify a template associated with an AI character generated by an AI character model, where the template includes parameters of the AI character model; receiving at least one value for at least one parameter of the AI character model; receiving a first request to store the template in a data store; storing the template in the data store and attributing the template to an account associated with the user; receiving, from the user, a second request to allow access to the template by at least one further user; and providing the access to the template to the at least one further user to enable the at least one further user to view and interact with the AI character.

18 Claims, 13 Drawing Sheets

(56) References Cited

U.S. PATENT DOCUMENTS

| | | | |
|---|---|---|---|
| 2014/0359439 A1* | 12/2014 | Lyren | G06F 16/9538 |
| | | | 707/706 |
| 2018/0342095 A1 | 11/2018 | Walsh | |
| 2019/0325632 A1* | 10/2019 | Rinker | G06Q 50/01 |
| 2019/0385065 A1* | 12/2019 | Reddy | G06N 3/006 |
| 2020/0234181 A1* | 7/2020 | Katz | G06N 20/00 |
| 2021/0295579 A1 | 9/2021 | Davis | |

* cited by examiner

| Possible User Inputs 702 | Input Impact for Goals Model 704 |
|---|---|
| AI Character Personality and Background Description 706 | Allow Constitution of AI Character Personality and Style, Which Biases the Reason for Which, and Manner in Which, the AI Characters Pursue Goals 708 |
| Motivations 710 | Structure Top-Level Motivations That Underlie the Reasoning for AI Character Behavior and Directions 712 |
| Flaws and Challenges 714 | Allow establishment of flaws and challenges, which may influence, motivate, or hinder goal enactment by an AI character 716 |
| Identity Profile 718 | Specify elements of an AI character (e.g., role, interests) which may have an influence on how the AI character pursues goals (e.g., a policeman trying to uncover information differently from a salesperson) 720 |
| Emotional Profile 722 | Establish an emotional profile of an AI character, such that it may influence expression of goals (e.g., more introverted character may be nervous if having to try and sell something) 724 |
| Personal Memory 726 | Provide an AI character with personal memories that may be brought up during the pursuit of a goal (e.g., if an AI character previously got bit by a dog and has to tie up a dog, the AI character may express fear or angst) 728 |
| World Knowledge 730 | Integrate information about the world to contextualize goal pursuit (e.g., the AI character may know that the police are corrupt in an area, and when pursuing an investigation show more caution) 732 |
| Contextual Knowledge 734 | Include information about an environment or context to contextualize goal pursuit (e.g., if a volcano just exploded and the AI character is asked to carry a girl to safety, the AI character may show more hurriedness) 736 |
| Voice Configuration 738 | Configuration of voice in real-time can allow AI characters to show different expressions during a goal (e.g., if an AI character is saving someone, the voice may be loud and forceful) 740 |
| Dialogue Style Controls 742 | Dialogue style influences the manner and style of speech (e.g., a Wild West bartender may still use slang when selling a drink) 744 |
| Goals and Actions 746 | Specify the goals that an AI character has per scene, and then set up the actions the AI character has available to pursue the goal 748 |
| Animation Triggers and Controls 750 | Determine which actual physical movements the AI character can take to pursue the goal (e.g., take an item off the shelf and show the player when selling) 752 |

PROVIDING A NETWORK FOR SHARING AND VIEWING ARTIFICIAL INTELLIGENCE CHARACTERS

CROSS-REFERENCE TO RELATED APPLICATIONS

The present application claims priority of U.S. Provisional Patent Application No. 63/436,123 filed on Dec. 30, 2022, entitled "PROVIDING A NETWORK FOR SHARING AND VIEWING ARTIFICIAL INTELLIGENCE CHARACTERS." The subject matter of the aforementioned application is incorporated herein by reference in its entirety for all purposes.

TECHNICAL FIELD

This disclosure generally relates to artificial intelligence (AI)-based character models. More particularly, this disclosure relates to providing a network for generating, sharing, and viewing AI characters.

BACKGROUND

Virtual characters play a pivotal role in various software applications, such as games, metaverses, social media, messengers, video communication tools, and online training platforms. Users engage with the virtual characters to enhance their digital experiences. However, existing virtual character models are often tailored for specific applications, thereby hindering their adaptability and interoperability.

One approach in conventional virtual character modeling relies on rigid descriptions of specific rules and adherence to predetermined logic. Consequently, user-generated virtual characters lack the flexibility to evolve and respond dynamically to user input, emotions, actions, or environmental changes. The static nature of existing virtual character models hampers the potential for virtual characters to mirror the dynamic and evolving nature of user interactions.

Moreover, while conventional virtual character models enable users to create virtual characters within specific applications, one shortcoming of the conventional virtual character models lies in the lack of functionality to provide users with options to share these user-created virtual characters with other users.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In an example embodiment, a system for providing a network for generating, sharing, and viewing AI characters is provided. The system may include a processor and a memory storing instructions to be executed by the processor. The processor may be configured to provide a web-based interface enabling a user of a computing device to generate and modify a template associated with an AI character generated by an AI character model. The template may include parameters of the AI character model. The processor may be further configured to receive, via the web-based interface from the user, at least one value for at least one parameter selected from the parameters of the AI character model. The processor may be further configured to receive, via the web-based interface from the user, a first request to store the template in a data store. In response to the receiving the first request, the template may be stored in the data store and attributed to an account associated with the user. The processor may be further configured to receive, via the web-based interface, from the user, a second request to allow access to the template by at least one further user of at least one further computing device. In response to the receiving the second request, the access to the template may be provided to the at least one further user. The at least one further user may be enabled to view and interact with the AI character generated by the AI character model based on the template.

In an example embodiment, a method for providing a network for generating, sharing, and viewing AI characters is provided. The method may commence with providing a web-based interface enabling a user of a computing device to generate and modify a template associated with an AI character generated by an AI character model. The template may include parameters of the AI character model. The method may proceed with receiving, via the web-based interface from the user, at least one value for at least one parameter selected from the parameters of the AI character model. The method may further include receiving, via the web-based interface from the user, a first request to store the template in a data store. In response to the receiving the first request, the template may be stored in the data store and attributed to an account associated with the user. The method may further include receiving, via the web-based interface, from the user, a second request to allow access to the template by at least one further user of at least one further computing device. In response to the receiving the second request, the access to the template may be provided to the at least one further user. The at least one further user may be enabled to view and interact with the AI character generated by the AI character model based on the template.

In another example embodiment, there is provided a non-transitory computer-readable storage medium, which stores processor-readable instructions. When the processor-readable instructions are executed by a processor, they cause the processor to implement the above-mentioned method for providing a network for generating, sharing, and viewing AI characters.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 7A shows an architecture diagram illustrating AI character models with goal oriented behavior, according to an example embodiment.

DETAILED DESCRIPTION

Figure 1:
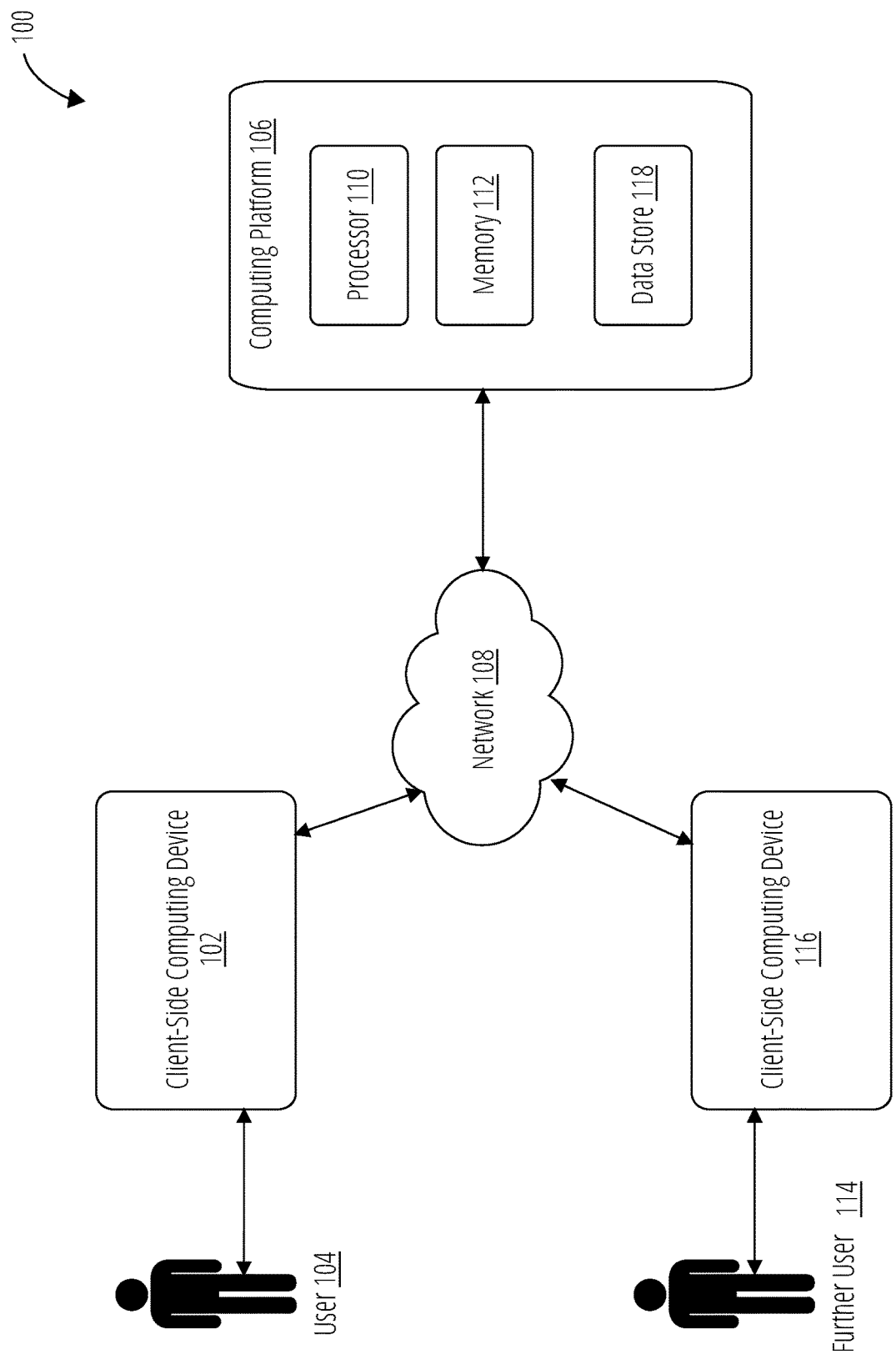
FIG. 1 illustrates an environment within which systems and methods for providing a network for generating, sharing, and viewing AI characters can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

Embodiments of the present disclosure are directed to a platform for generating AI character models. In one example embodiment, the platform may receive a description of a character and generate an AI character model capable of interacting with users verbally and through emotions, gestures, actions, and movements. The AI character model may be configured to generate AI characters. The AI character model may be presented to a user in the form of an AI character in a virtual environment provided to the user via a client-side computing device. The description can be provided using a natural language describing a role, motivation, and environment of an AI character. The platform may utilize a common knowledge to train the AI character model in order to interact with the users. The AI character model may evolve its characteristics, change emotions, and acquire new knowledge based on conversations with the users.

The AI character model may utilize a large language model (LLM) in conversations with users. In order to obtain more effective and appropriate responses to user questions and messages, the platform may apply various restrictions, classification, shortcuts, and filters in response to user questions. These targeted requests to the LLMs may result in optimized performance. For example, prior to sending a request to the LLM, the platform may classify and filter user questions and messages to change words based on the personalities of AI characters, emotional states of AI characters, emotional states of users, context of a conversation, scene and environment of the conversation, and so forth. Similarly, the platform may adjust the response formed by the LLM by changing words and adding fillers based on the personality, role, and emotional state of the AI character. The AI character model may change emotions based on the role of the AI character and in response to the emotions of the user.

The platform may include integration interfaces, such as application programming interfaces (APIs), allowing external applications to use the AI character model. The AI character models generated by the platform can be used in game applications, virtual events and conversations, corporate trainings, and so on.

The present disclosure relates to a system and a method for providing a network for generating, sharing, and viewing AI characters. The system and the method may be integrated into the platform for generating AI character models. An example system and method may provide a web-based interface to allow users to store, view, and share AI characters. A user may search and view a list of AI characters created by other users and interact with the AI characters from the list. Specifically, the method may commence with providing a web-based interface enabling a user of a computing device to generate and modify a template associated with an AI character. The template may include parameters of an AI character model configured to generate the AI character. The method may proceed with receiving, via the web-based interface from the user, at least one value for at least one parameter selected from the parameters of the AI character model. The method may further include receiving, via the web-based interface from the user, a first request to store the template in a data store. In response to the receiving the first request, the template may be stored in the data store and attributed to an account associated with the user. The method may proceed with receiving, via the web-based interface, from the user, a second request to allow access to the template by at least one further user of at least one further computing device. In response to the receiving the second request, the access to the template may be provided to the at least one further user. The at least one further user may be enabled to view and interact with the AI character generated by the AI character model based on the template.

Referring now to the drawings, FIG. 1 illustrates an environment 100 within which systems and methods for controlling safety settings for behavior characteristics of an AI character model can be implemented. The environment 100 may include a client-side computing device 102 associated with a user 104, a computing platform 106 for providing an AI character model (also referred to herein as a computing platform 106), a data network shown as a network 108, and a client-side computing device 116 associated with a further user 114. The computing platform 106, the client-side computing device 102 (also referred to herein as a client), and the client-side computing device 116 (also referred to herein as a client) may communicate via the network 108.

The client-side computing device 102 may include, but is not limited to, a smartphone, a laptop, a personal computer, a desktop computer, a tablet computer, a phablet, a personal digital assistant, a mobile telephone, a smart television set, a personal computing device, and the like. The computing platform 106 may include a processor 110 and a memory 112 storing instructions to be executed by the processor 110. The computing platform 106 may also include a data store 118.

The network 108 can refer to any wired, wireless, or optical networks including, for example, the Internet, intranet, a Local Area Network (LAN), a Personal Area Network, Wide Area Network (WAN), a Virtual Private Network, a Wi-Fi® network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the network 108 may include a corporate network, a data center network, a service provider network, a mobile operator network, or any combinations thereof.

Figure 2:
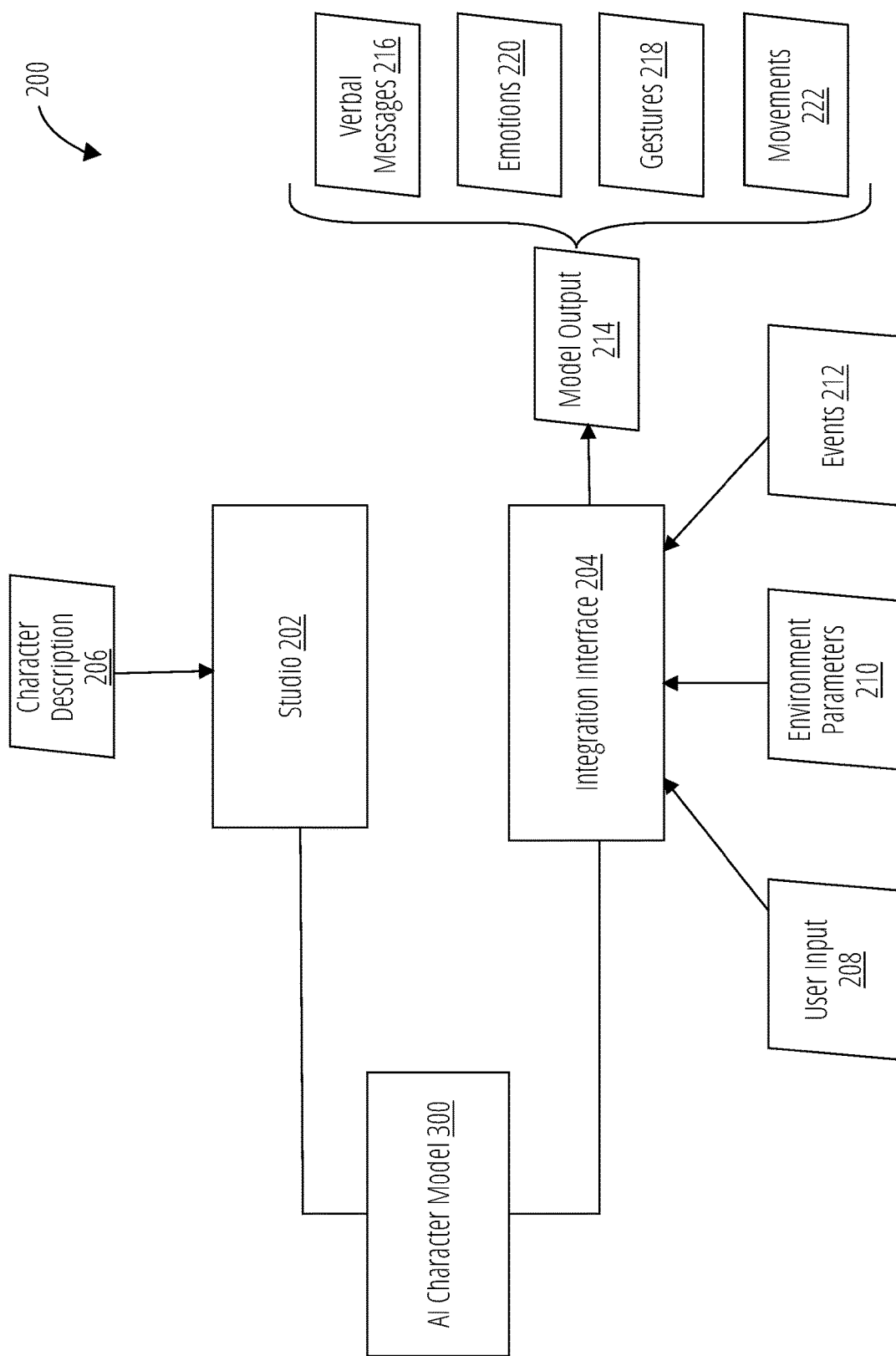
FIG. 2 illustrates a platform for developing an AI character model, according to an example embodiment.

The computing platform 106 may be associated with an AI character model (shown in detail in FIG. 2). The AI character model may be configured to generate AI-based characters, also referred herein to as AI characters. The user 104 and further user 114 may use the computing platform 106 to create the AI character models and interact with the AI character models via the client-side computing device 102 in a virtual environment associated with the AI character. The data store 118 can be configured to store templates of AI character model designed by user 104 and further user 114. The virtual environment can be generated by the client-side computing device 102 for presenting to the user 104 or by client-side computing device 116 for presenting to further user 114. The computing platform 106 is shown in detail in FIG. 2 as a platform 200.

FIG. 2 illustrates a platform 200 for generating AI character models, according to an example embodiment. The platform 200 may include a studio 202, an integration interface 204, and an AI character model 300.

In one example embodiment, the studio 202 may receive, via a user interface, a character description 206 of an AI character and generate, based on the description, the AI character model 300. The character description 206 can be provided using a natural human language. The character description 206 may include a description of a character similar to a description that can be provided to a real actor.

The user interface of the studio 202 may include input fields allowing a developer to enter different aspects of the AI character. In an example embodiment, each input field may define a part of the brain of the AI character.

The input fields may include a text field for entering a core description of the AI character. An example core description can include "Buddy is a kind young man from Argentina." The input fields may include a text field for entering a motivation of the AI character. An example motivation may include "Buddy likes to dance."

The input fields may also include a text field for entering common knowledge and facts that the AI character may possess. For example, the field for the common knowledge may include "orcs from Mordor; orcs like to eat hobbits."

The input fields may include fields for selecting an avatar and voice of the AI character. The input fields may include fields for defining memory and personality features of the AI character. The input fields may also include a text field describing the scene and environment in which the AI character is placed. For example, the text field for the scene may include "savanna," "city," "forest," "bar," and so on.

The integration interface 204 may receive a user input 208, environment parameters 210, and events 212 and generate, based on the AI character model 300, a model output 214.

The user input 208 may include voice messages of a user. The voice messages may include phrases commonly used in conversations. The integration interface 204 may generate, based on the voice messages, requests and provide the request to the AI character model 300 to generate the model output 214. The requests may include text messages verbalized by the user and an emotional state of the user.

The model output 214 may include verbal messages 216, gestures 218, emotions 220, and movements 222. The verbal messages 216 may include a response to the user voice messages. The gestures 218 may include movements of the body of the AI character either accompanying the verbal messages 216 or occurring without verbal messages 216. Emotions 220 may include intonations of voice of the AI character while uttering the verbal messages 216 or facial expressions of the AI character.

Figure 3:
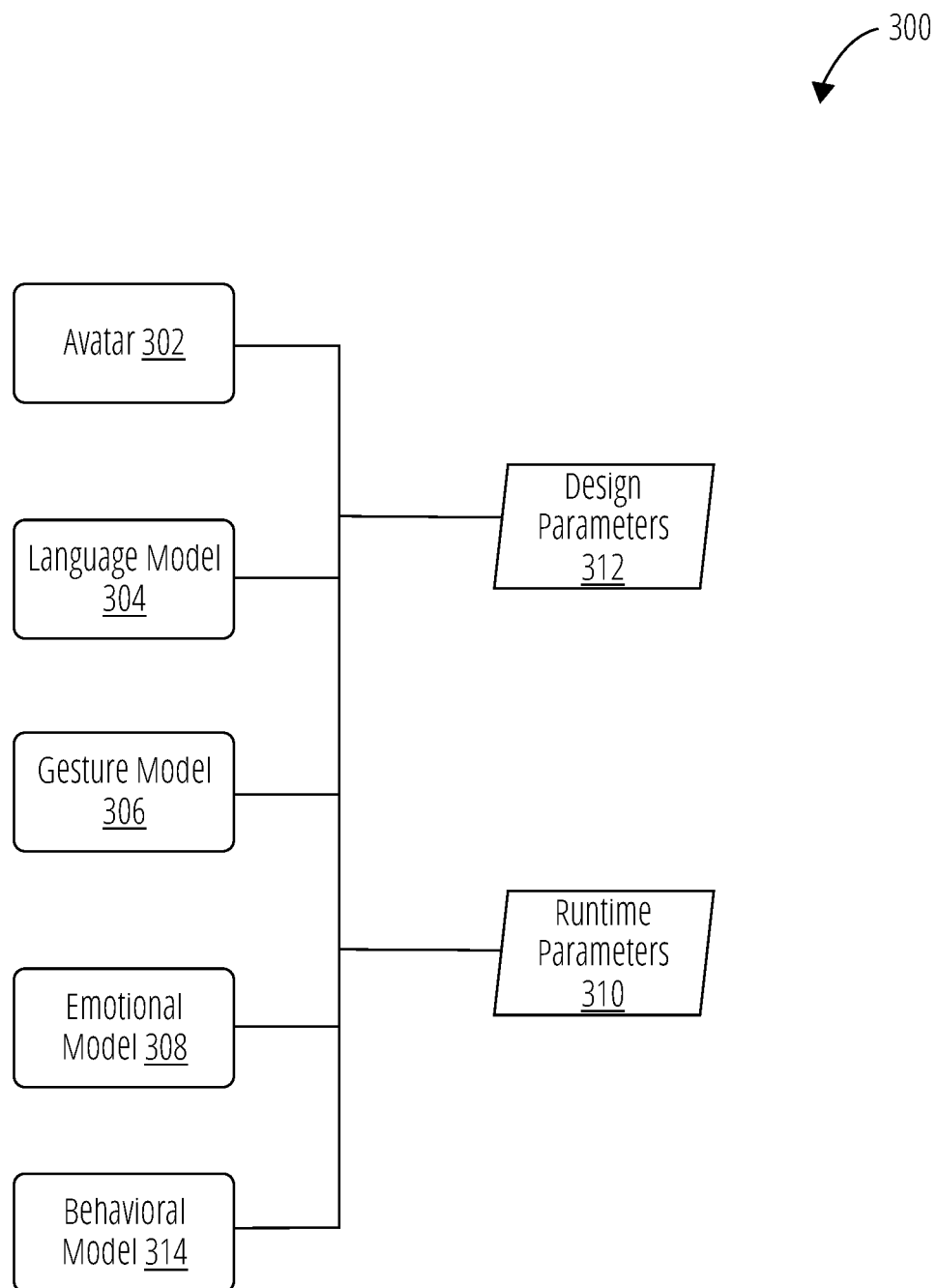
FIG. 3 provides additional details for an AI character model, according to an example embodiment.

FIG. 3 provides additional details for an AI character model 300 in accordance with various example embodiments. The AI character model 300 may include a set of models including an avatar 302, a language model 304, a gesture model 306, an emotional model 308, a behavioral model 314, and the like. The models may include machine learning models. In some embodiments, the models can be implemented as artificial neural networks. The AI character model 300 can include runtime parameters 310 and design parameters 312.

The design parameters 312 may correspond to settings for personality and general emotions of an AI character. The design parameters 312 can be generated based on character description 206 received via the studio 202.

The runtime parameters 310 may correspond to an emotional state of an AI character. The emotional state can be changed based on conversations with the user and elements in the scene and the surrounding environment in which the AI character is currently present.

The avatar 302 may include a three-dimensional body model rendering the AI character. In some embodiments, the avatar 302 can be created using applications currently available on the market.

The language model 304 can be based on an LLM. The LLM is a machine learning algorithm that can recognize, predict, and generate human languages on the basis of very large text-based data sets. The language model 304 may form a request for the LLM, receive a response from the LLM, and process the response from the LLM to form a reply to the user voice messages. The request for the LLM can include a classification and adjustment of the text requests from the integration interface 204 according to the current scene, environmental parameters, an emotional state of the AI character, an emotional state of the user, and current context of the conversation with the user. Processing of the response from the LLM may include filtering of the response to exclude unwanted words, verifying relevancy of the response, changing the words in the response, and adding fillers according to the personality of AI characters. In other embodiments, the language model 304 may also retrieve data from available sources, such as Wikipedia® or Game Wikipedia®, to generate the response.

The gesture model 306 may generate a movement of the body of the AI character based on the response to the user, an emotional state of the AI character, and current scene parameters. For example, the AI character may turn to the user and raise a hand in response to a greeting from the user. The greeting gestures can be different in different scenes and environments.

The emotional model 308 may track the emotional state of the AI character based on the context of the conversation with the user, an emotional state of the user, a scene, and environmental parameters.

The behavioral model 314 may track and change behavioral characteristics of the AI character as a result of conversations with users or changes in the environment and scenes during a predetermined time period.

In general, the LLM can statistically suggest a continuation to any input provided to the LLM. If a conversation is started by using the LLM, the LLM may propose the next step for the conversation. For example, if a conversation includes a story related to some topic, the LLM may propose the next line for the story.

One of the key characteristics of LLMs is the fact that LLMs are large. In particular, the LLMs are trained on vast amounts of data. When used in conversations, the LLMs can statistically suggest some text determined by the LLMs to be meaningful in the next step of the conversation. Therefore, the LLMs conventionally build the conversation based on the text itself.

Figure 4:
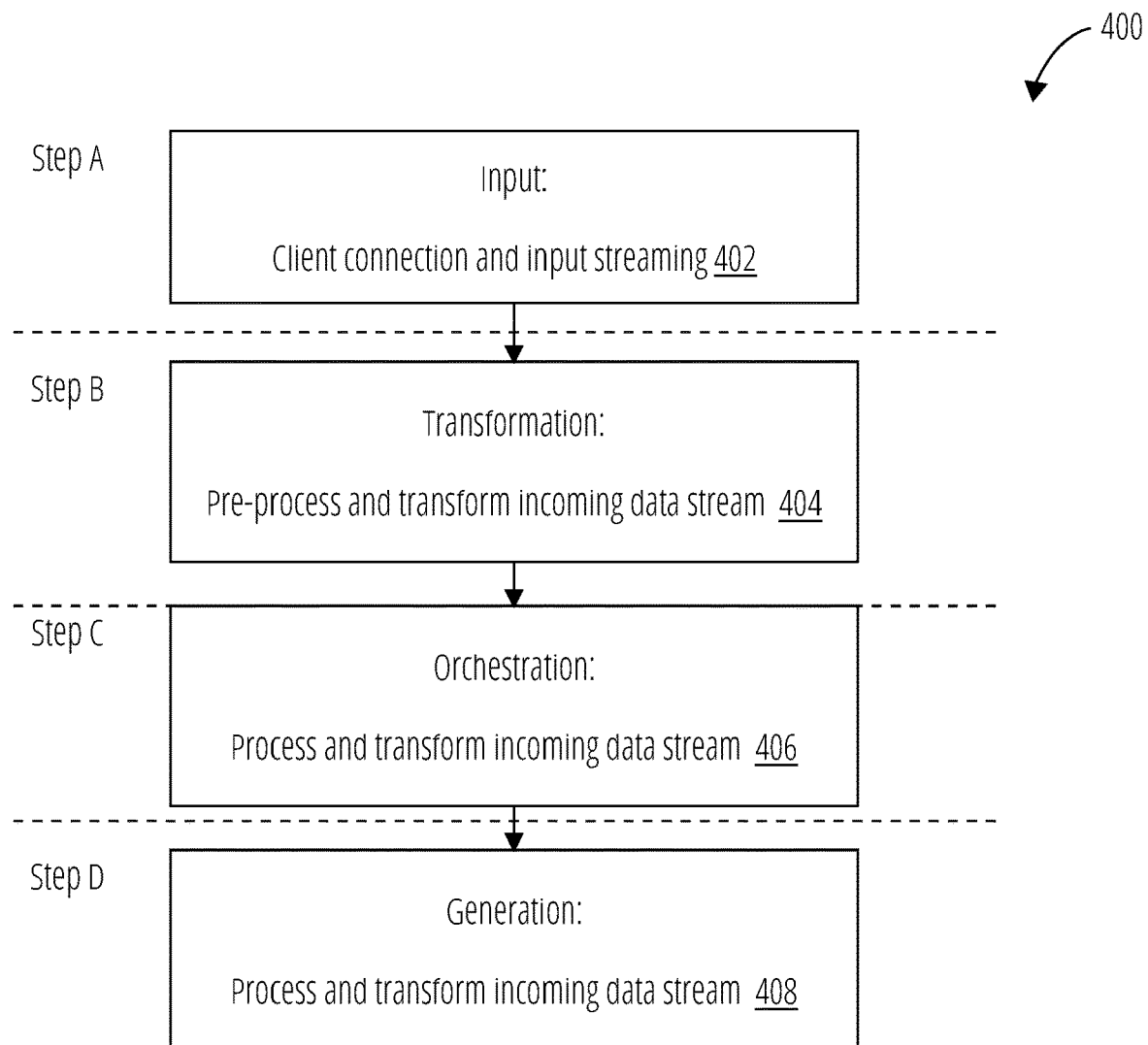
FIG. 4 is an architecture diagram that shows using a surrounding architecture of an AI character model to control an output and behavior generated by a large language model (LLM), according to an example embodiment.

FIG. 4 is an architecture diagram 400 that shows using a surrounding architecture of an AI character model to control an output and behavior generated by LLMs, according to an example embodiment. The main steps implemented to control the output and behavior of AI characters using the AI character model include an input step 402 (step A), a transformation step 404 (step B), an orchestration step 406 (step C), and a generation step 408 (step D). The input step 402 includes providing a connection with a client and performing input streaming. The transformation step 404 includes pre-processing and transforming an incoming data stream. The orchestration step 406 and the generation step 408 include processing and transforming an incoming data stream. Steps A-D are shown in detail in FIG. 5, FIG. 6A, and FIG. 6B.

Figure 5:
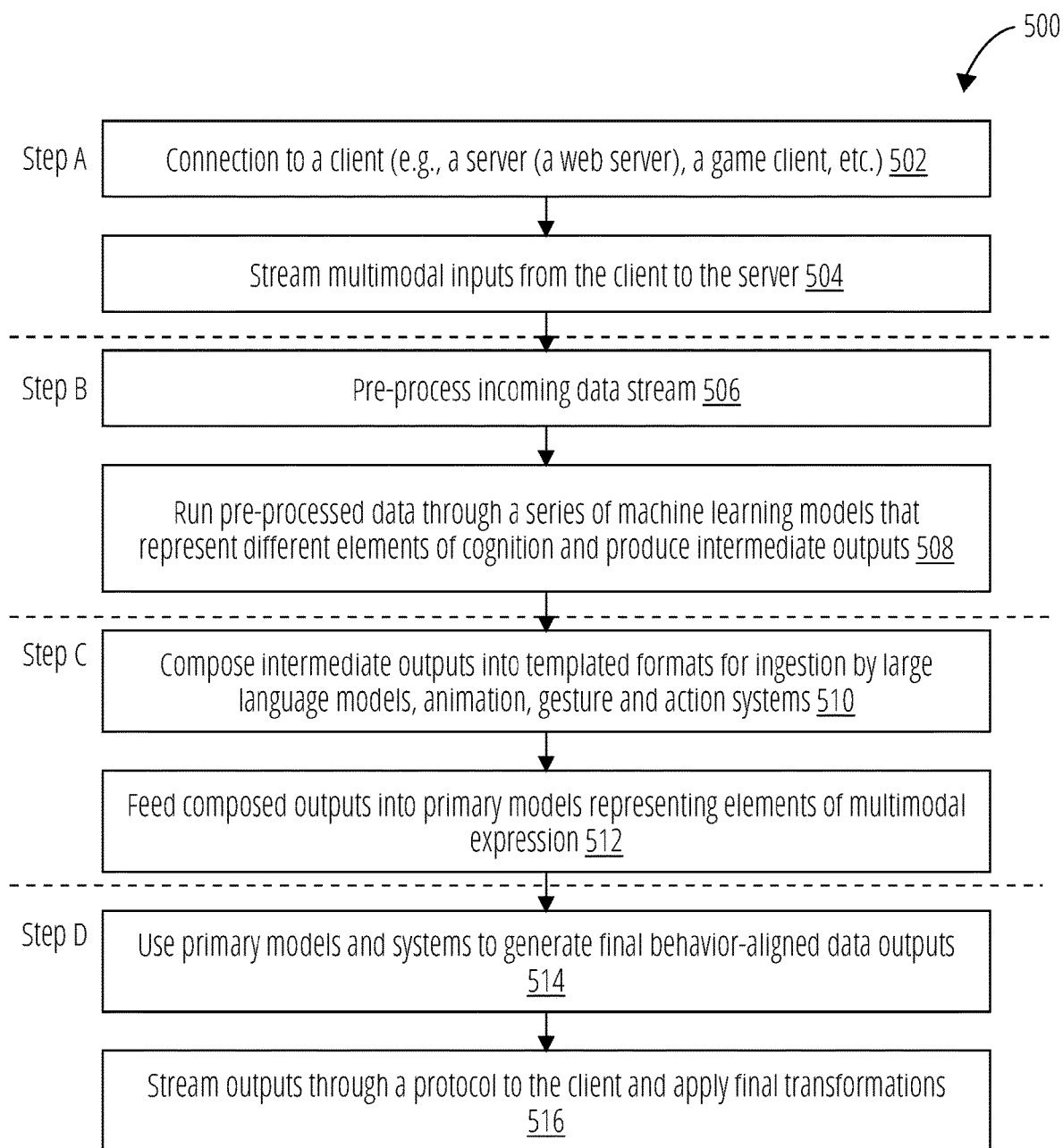
FIG. 5 is a detailed architecture diagram showing a surrounding architecture of an AI character model, according to an example embodiment.

FIG. 5 is a detailed architecture diagram 500 showing a surrounding architecture of an AI character model, according to an example embodiment. The input step (step A) may include establishing a connection between a client and a server, as shown in block 502. In an example embodiment, the client may include a user device associated with a user. The user may use the user device to interact with AI characters in a virtual environment using an application running on the user device. To establish the connection between the system of the present disclosure and the client, a server (e.g., a web server), a game client, and an application running on the user device may be provided. The server, the game client, and the application may be set up based on predetermined rules to enable streaming multimodal inputs from the client to the server, as shown in block 504. The inputs are shown in detail in FIG. 6A.

Figure 6A:
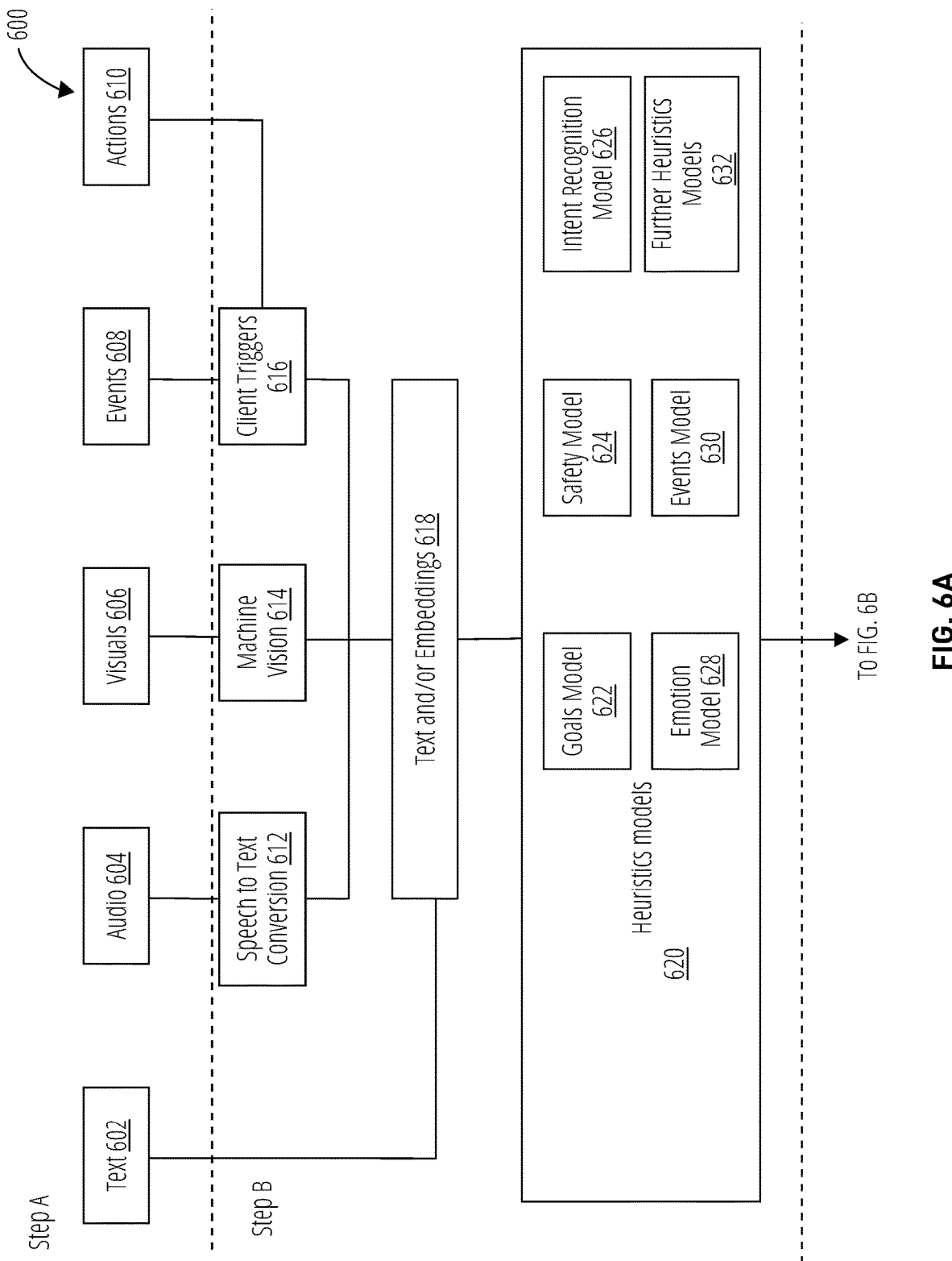
FIG. 6A is a detailed architecture diagram showing a surrounding architecture of an AI character model, according to an example embodiment.
Figure 6B:
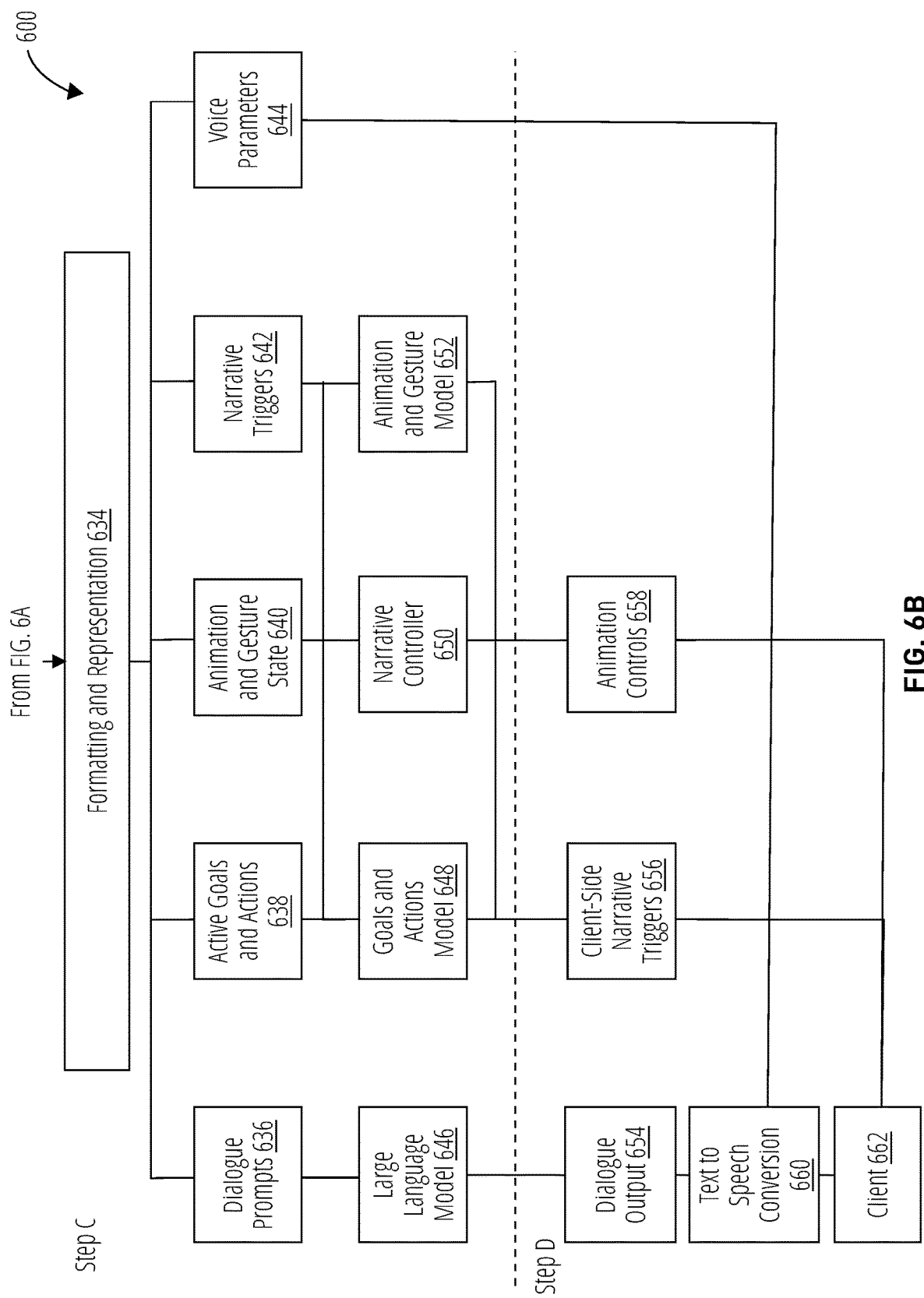
FIG. 6B is a detailed architecture diagram showing a surrounding architecture of an AI character model, according to an example embodiment.

FIG. 6A and FIG. 6B show a detailed architecture diagram 600 that illustrates a surrounding architecture of an AI character model, according to an example embodiment. The connection established between the client and the server via predetermined protocols enables collecting a plurality of streams of inputs from the client. Each stream may be associated with one of multiple modalities. In an example embodiment, the modality may include a type of data. As shown in FIG. 6A, the inputs collected from the client may include text 602, audio 604, visuals 606, events 608, actions 610, gestures (not shown), and so forth.

Referring again to FIG. 5, the transformation step (step B) may include pre-processing the incoming streams of data in block 506. The streams of inputs may be pre-processed differentially based on the specific modality. The pre-processing may include converting the received inputs into a singular format. The pre-processing is shown in detail in FIG. 6A.

As shown in FIG. 6A, the text 602 is in the form of a natural language and may need no pre-processing. The audio 604 may be pre-processed using a speech to text conversion 612, in the course of which the audio input may be transformed into text. The visuals 606 may be pre-processed using a machine vision 614 based on object classification, environment understanding, and so forth.

The events 608 may include any event received from the client. An example event may include a button click in a game, an AI character moving a sword in a game, a button click in a web application, and so forth. The actions 610 may be received from an environment of AI characters with which the user interacts. An example action may include reacting to a horse riding by in an application, calling a web hook to retrieve information, and so forth. The events 608 and the actions 610 may be processed into client triggers 616. Based on the pre-processing, all inputs may be transformed into text and/or embeddings 618. The embeddings (also referred to as word embeddings) are word representations, in which words with similar meaning have a similar representation. Thus, a pre-processed data stream in the form of text and/or embeddings 618 may be obtained upon pre-processing of the received inputs.

Referring again to FIG. 5, the transformation step (step B) may further include running the pre-processed data through a series of machine learning models that represent different elements of cognition and producing intermediate outputs, as shown in block 508. Processing the data using the series of machine learning models is shown in detail in FIG. 6A.

As shown in FIG. 6A, the text and/or embeddings 618 may be passed through a plurality of machine learning models shown as heuristics models 620. The processing of the text and/or embeddings 618 using the heuristics models 620 may include passing the text and/or embeddings 618 through a goals model 622, a safety model 624, an intent recognition model 626, an emotion model 628, an events model 630, and a plurality of further heuristics models 632.

The goals model 622 may be configured to process the text and/or embeddings 618 and recognize, based on what was said by the user or the AI character, what goals need to be activated. The safety model 624 may be configured to process the text and/or embeddings 618 and filter out unsafe responses. The intent recognition model 626 may be configured to process the text and/or embeddings 618 and determine what a player (i.e., a user) intends to do and use an intent to trigger one or more events at a later point of interaction of the player with AI characters in the game.

The emotion model 628 may be configured to process the text and/or embeddings 618 and update, based on what the player said, the emotions of the AI character. The events model 630 may be configured to process the text and/or embeddings 618 and determine the events. The events may act as triggers for performing an action based on predetermined rules. For example, a predetermined rule may include a rule according to which when the player steps into a specific location (the event) near the AI character, the AI character takes a predetermined action.

Upon the processing of the data, the heuristics models 620 may provide intermediate outputs. Each of the intermediate outputs provided by the heuristics models 620 may be a differential element. Specifically, the goals model 622, the safety model 624, the intent recognition model 626, the emotion model 628, and the events model 630 may each provide a specific sort of a separate element. The separate elements need to be orchestrated by composing together into a specific templated format.

Referring again to FIG. 5, the orchestration step (step C) may include composing the intermediate outputs received from the heuristics models into templated formats for ingestion by LLMs and animation, gesture, and action models in block 510. Upon composing the intermediate outputs into a template, the composed outputs may be fed into primary models representing elements of multimodal expression, as shown in block 512. The orchestration step (step C) is further shown in detail in FIG. 6B.

As shown in FIG. 6B, the orchestration step (step C) may include formatting and representation 634 of the intermediate outputs received from the heuristics models. Upon being formatted, the composed data may be sent to another series of AI models. Specifically, the composed data received in block 510 shown in FIG. 5 may include dialogue prompts 636, active goals and actions 638 (i.e., what goals and actions need to be active based on what was said or done by the user or the AI character), animation and gesture state 640 (i.e., what gestures or animations need to be active depending on the emotional state and the goal), narrative triggers 642, voice parameters 644, and so forth. The dialogue prompts 636 may be provided to an LLM 646. The active goals and actions 638 may be provided to a goals and actions model 648, the narrative controller 650, and the animation and gesture model 652. The animation and gesture state 640 may be provided to the goals and actions model 648, the narrative controller 650, and the animation and gesture model 652.

The narrative triggers 642 may be provided to the goals and actions model 648, the narrative controller 650, and the animation and gesture model 652. An example of the narrative triggers 642 may include words "I want to be in the investigation" said by the player. The goals and actions model 648, the narrative controller 650, and/or the animation and gesture model 652 may receive this narrative trigger and change the storyline and progress forward in the game.

The voice parameters 644 may be used for enacting the voice in the virtual environment. For example, if the AI character is angry, the voice parameter "angry" may be used to change the voice of the AI character in the game. If the state of the AI character changes to very forceful, the state can be shown by changing the voice of the AI character.

Referring again to FIG. 5, the generation step (step D) may include using primary models and systems to generate final behavior-aligned data outputs in block 514. The generation step (step D) may further include streaming outputs through predetermined protocols to the client and applying final transformations in block 516. The generation step (step D) is further shown in detail in FIG. 6B.

As shown in FIG. 6B, the LLM 646 is a model used to generate a dialogue output 654. The goals and actions model 648 and the narrative controller 650 both decide what needs to be sent to the client side. The client side may be represented by a client engine, a game engine, a web application running on a client-side computing device, and the like. The goals and actions model 648 and the narrative controller 650 may decide what needs to be enacted on the client side. The animation and gesture model 652 may decide what animations or gestures need to be activated on the client side to enact the behavior of AI characters. Therefore, the goals and actions model 648, the narrative controller 650, and the animation and gesture model 652 provide client-side narrative triggers 656 and animation controls 658. The dialogue output 654, the client-side narrative triggers 656, and the animation controls 658 provide the dialogue, the events, the client-side triggers, and the animations that need to be enacted on the client side.

The dialogue output 654, the client-side narrative triggers 656, the animation controls 658, and the voice parameters 644 may be processed using text to speech conversion 660. The output data obtained upon applying the text to speech conversion 660 are sent as a stream to the client 662. The game engine animates the AI character based on the received data to provide the generative behavior of the AI character. The animating may include, for example, instructing the AI character on what to say, how to move, what to enact, and the like.

Figure 7B:
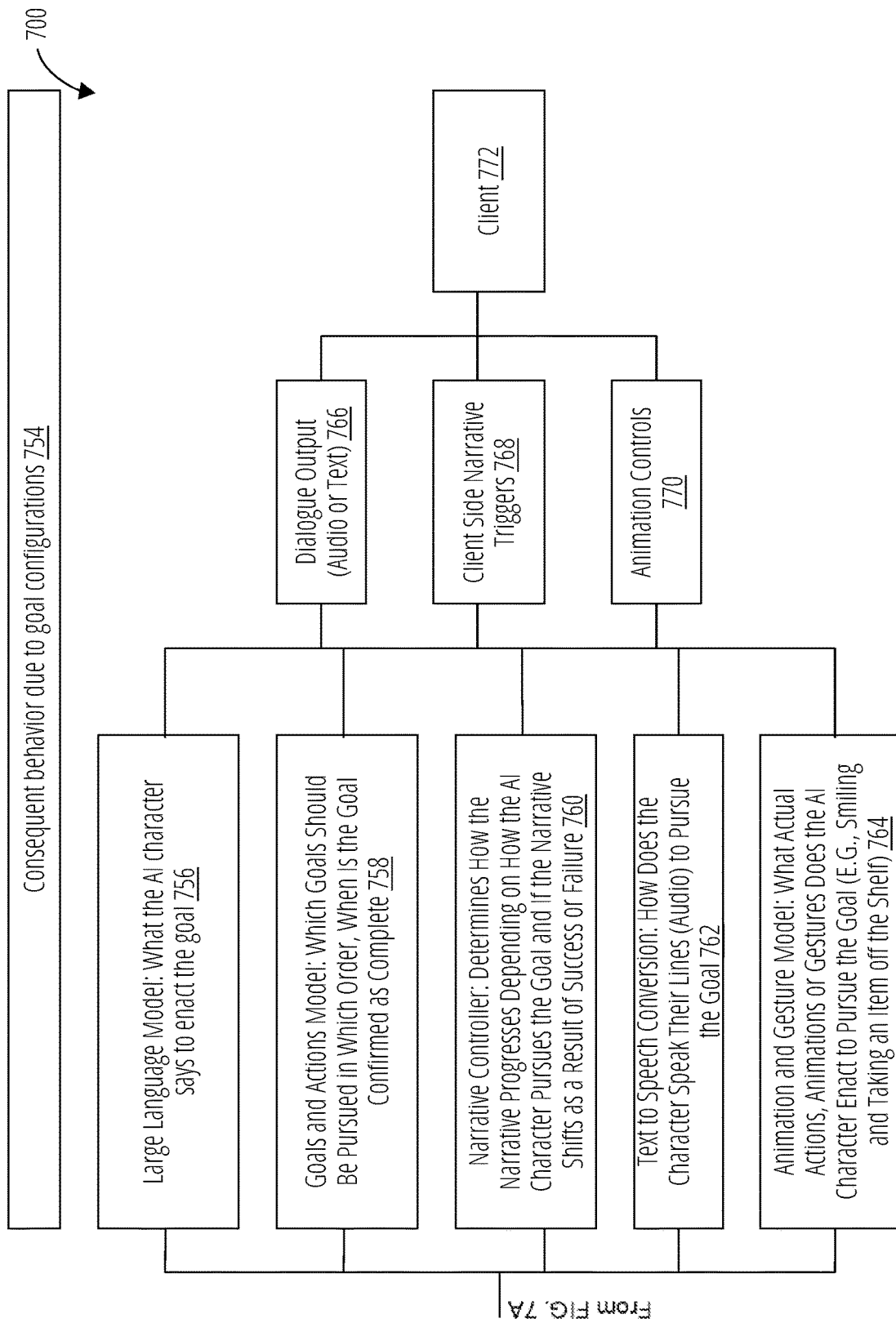
FIG. 7B shows an architecture diagram illustrating AI character models with goal oriented behavior, according to an example embodiment.

FIG. 7A and FIG. 7B show an architecture diagram 700 illustrating AI character models with goal oriented behavior, according to an example embodiment. The AI character models may include generative models configured to follow sequential instructions for dialog and actions that are driven by a specific purpose or intent for AI-driven characters. FIG. 7A shows possible user inputs 702 and input impact for goals model 704. The possible user inputs 702 include fields that are exposed to the user and can be changed by the user in the studio. The input impact for goals model 704 includes impacts of each user input on the goals model.

Compared to general language models that provide general goals for AI characters, the goals model enables providing specific goals. FIG. 7A shows that each type of configuration caused by the possible user inputs 702 may influence the goals and actions of the AI character. More specifically, the AI character personality and background description 706 selected by the user has an impact on the constitution of AI character personality and style, which biases the reason for which, and manner in which, the AI character pursues goals, as shown in block 708. Therefore, the AI character personality and background description 706 may influence how the AI character enacts its goals. For example, if the AI characters are Alice in Wonderland® versus Jack Sparrow®, the AI characters may have the exact same goal (e.g., to show their house to a player). However, the AI characters may show their houses in completely different ways because the AI characters represent two different people.

The motivations 710 received from the user may structure top-level motivations that underlie the reasoning for all AI character behavior and directions, as shown in block 712.

Therefore, the motivations 710 may effectively determine why this AI character is pursuing this goal, i.e., determine the top-level motivation of the AI character. For example, the motivation of Alice in Wonderland® is to get home. The goals of Alice are to ask the Mad Hatter what he knows about Wonderland. These goals may be determined and provided to the top-level motivation.

Flaws and challenges 714 selected by the user allow establishment of flaws and challenges for the AI character, which may influence, motivate, or hinder goal enactment by the AI character, as shown in block 716.

An identity profile 718 selected by the user may specify elements of an AI character (e.g., role, interests) which may have an influence on how the AI character pursues goals (e.g., a policeman trying to uncover information differently from a salesperson), as shown in block 720. The flaws and challenges 714 and the identity profile 718 are ways of enacting so as to influence the goal more contextually. For example, the AI character is Indiana Jones and his flaw is that he is scared of snakes. The goal of the AI character is to cross a cavern covered in snakes. Therefore, based on the flaw, the AI character may say, "Oh, I'm so scared of snakes," and then achieve the goal. Therefore, the flaws and challenges 714 are used to add a context to the goal oriented behavior of the AI character. The identity profile 718 is used similarly to further contextualize the goal oriented behavior of the AI character. For example, the AI characters may include a police person (a first identity) and a salesperson (a second identity) both trying to uncover information, but the salesperson may do it very differently than the police person.

An emotional profile 722 received from the user may be used to establish an emotional profile of an AI character, such that the emotional profile may influence expression of goals, as shown in block 724. The emotional profile 722 may include the expression. For example, the introvertedness of the AI character may be turned up to make the AI character introverted, in which case if the AI character had to sell something or the AI character had to say something to someone, the AI character may be more nervous than if the AI character was extroverted.

Various parts of memories, such as a personal memory 726, world knowledge 730, and contextual knowledge 734 provide information that may be relevant to the pursuit of a goal. Specifically, the personal memory 726 may be used to provide an AI character with personal memories that may be brought up during the pursuit of a goal, as shown in block 728. For example, if the AI character remembers that the AI character recently was bitten by a dog and the goal is to go in and tie up a dog, the AI character may express fear or angst and say, "Oh, I can do that, but I'm really scared, I had this bad experience." Therefore, changing the behavior of the AI character based on the personal memory 726 makes the behavior more realistic.

The world knowledge 730 may be used to integrate information about the world to contextualize pursuit of the goal, as shown in block 732. The world knowledge 730 may be used to further contextualize the behavior of the AI character. For example, in a specific science fiction world, the AI character knows that all the police are corrupt in an area and working for an evil overlord. Therefore, the AI character may be scared or show more cautious when pursuing an investigation.

The contextual knowledge 734 may be processed to include information about an environment or context to contextualize pursuit of the goal, as shown in block 736. For example, if a volcano has just exploded and the AI character is asked to carry a girl to safety, the AI character may show more hurriedness, and may be forceful to the girl, versus if that was not true, the AI character might pursue the goal differently.

Voice configuration 738 may be used to determine the configuration of voice in real-time, which can allow AI characters to show different expressions when pursuing a goal, as shown in block 740. For example, if the AI character is a fireman who is saving someone, it may be extremely loud in a burning building; therefore, the voice of the AI character may be made loud and forceful. The AI character may pursue the goal differently as compared, for example, the case when the AI character was doing the same actions in a courtroom.

Dialogue style controls 742 may be used to control a dialogue style of an AI character. The dialogue style may influence the manner and style of speech of the AI character, as shown in block 744. For example, the user may set the dialog style to be a modern day New York dialogue style or a Wild West style. In each of the styles, the AI character may use different words. For example, a Wild West bartender may use slang when selling a drink.

Goals and actions 746 received from the user may be processed to specify the goals that an AI character has per scene, and then set up the actions that the AI character has available to pursue the goal, as shown in block 748. Therefore, the goals and actions 746 specify the goals for the scene in which the AI character is currently present, the sequence of goals, and actions that the AI characters have to do to pursue the goals.

Animation triggers and controls 750 may include animations and gestures, which may determine which actual physical movements the AI character can take to pursue the goal, as shown in block 752. For example, the AI character is selling an item and needs to take the item off the shelf and show it to the player when selling.

The input impact for goals model 704 are provided to a plurality of AI models to generate a consequent behavior 754 due to goal configurations, as shown in FIG. 7B. More specifically, the LLM may determine what the AI character needs to say to enact the goal, as shown in block 756. The goals and actions model shown in block 758 is the controller for determining which goals need to be pursued and in which order, when is the goal confirmed as complete, and the like.

The narrative controller determines how the narrative progresses depending on how the AI character pursues the goal (the goal is successful or failed) and if the narrative shifts as a result of a success or a failure, as shown in block 760. For example, in a game an AI character is supposed to save a girl, but the AI character fails, and the girl dies. This failure to complete the goal may change the narrative. The narrative controller may send a trigger to change the behavior of the AI character based on this failure to the game engine.

The text to speech conversion model determines how the AI character speaks his lines (audio) to pursue the goal, as shown in block 762. The parameters to be changed may also include, for example, the dialogue style and voice configuration.

The animation and gesture model may determine what actual actions, animations, or gestures the AI character enacts to pursue the goal (e.g., smiling and taking an item off the shelf, picking up a girl to save her from a burning building), as shown in block 764.

The outputs obtained in blocks 756-764 may include a dialogue output (audio or text) 766, client side narrative triggers 768, and animation controls 770. The dialogue output (audio or text) 766, the client side narrative triggers 768, and the animation controls 770 may be provided to a client 772 (e.g., a client engine, a game engine, a web application, and the like).

Figure 8:
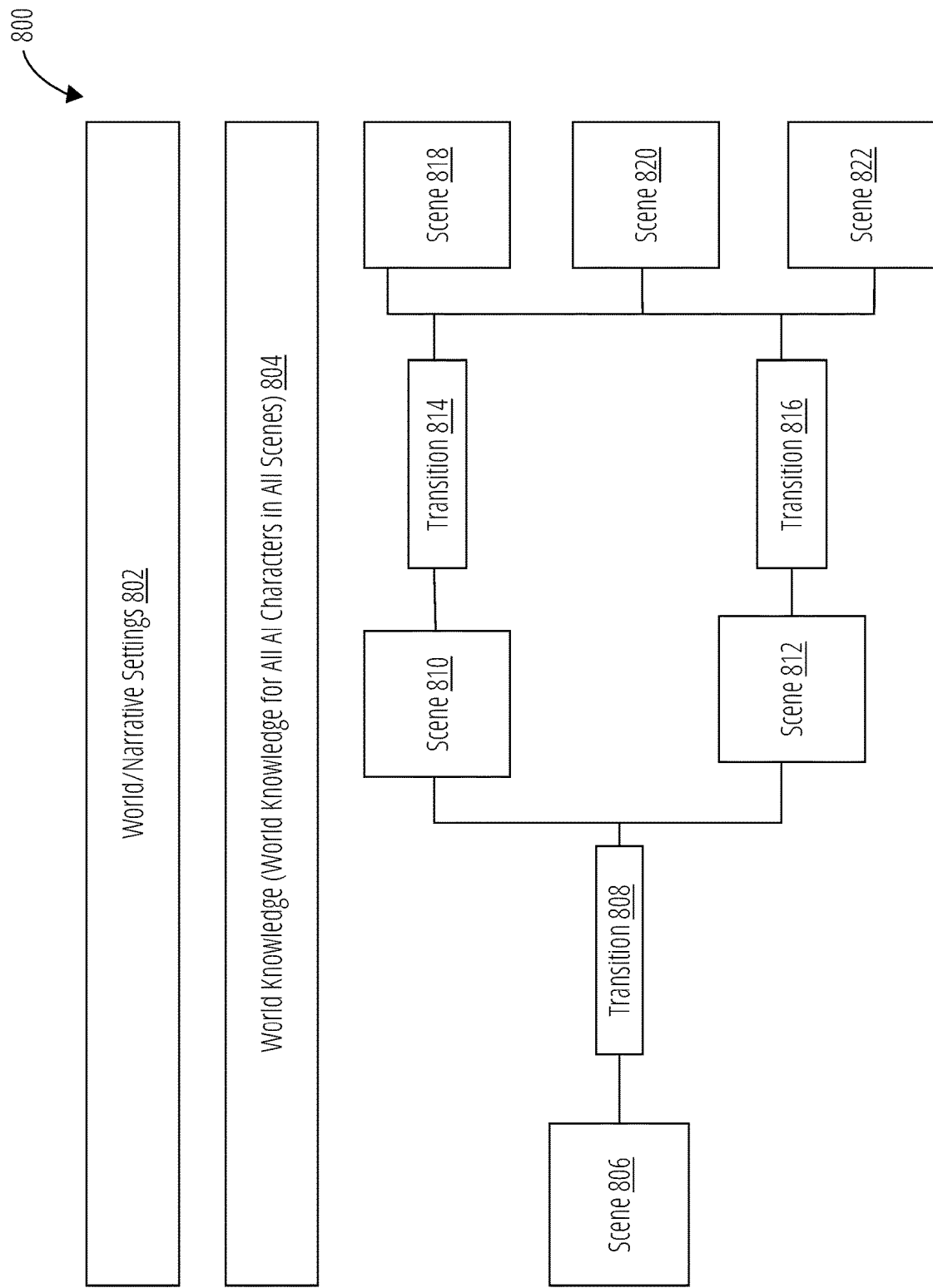
FIG. 8 is a block diagram illustrating a narrative structure that shows a context of scenes used to distinguish context for goals, according to an example embodiment.

FIG. 8 is a block diagram 800 illustrating a narrative structure that shows a context of scenes used to distinguish context for goals, according to an example embodiment. The narrative structure may include world/narrative settings 802 and world knowledge 804 (world knowledge for all AI characters in all scenes). The world/narrative settings 802 and the world knowledge 804 may be used to transition from one scene to another in a story. Therefore, a story or an experience associated with an AI character may happen as a series of scenes and transitions.

In an example embodiment, an AI character may exist in a scene 806. Based on the world/narrative settings 802 and the world knowledge 804, the scene 806 may be transitioned in block 808 into a scene 810 and a scene 812. The scene 810 may be transitioned in block 814 and the scene 812 may be transitioned in block 816 into a scene 818, a scene 820, and a scene 822.

Figure 9:
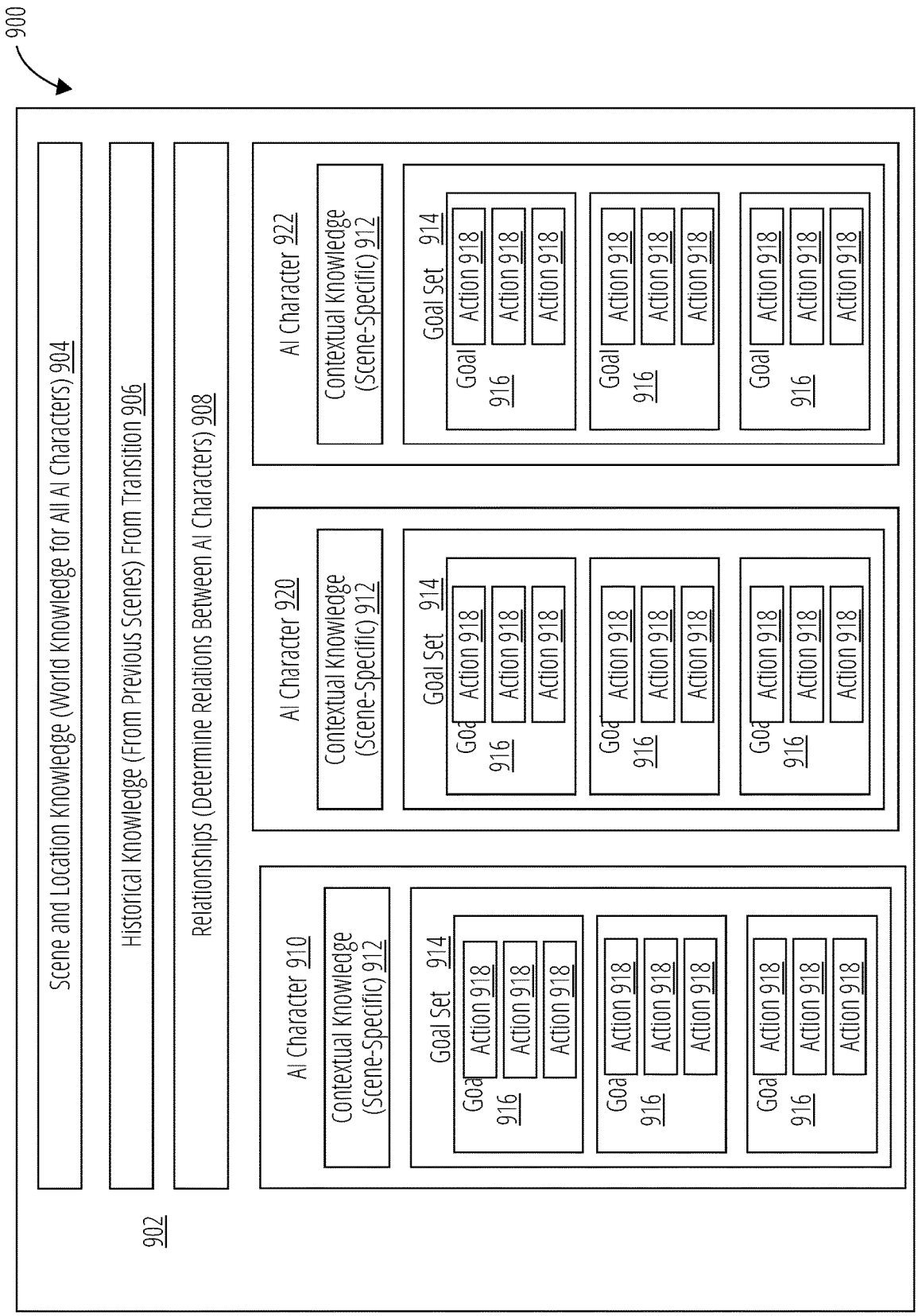
FIG. 9 is a block diagram illustrating a structure of goals within scenes, according to an example embodiment.

FIG. 9 is a block diagram 900 illustrating a structure of goals within scenes, according to an example embodiment. Within each scene, for each specific AI character, there is a goal that the AI character has to pursue. A scene 902 may be driven by a plurality of parameters. The parameters may include scene and location knowledge 904, which may include world knowledge for all AI characters. The parameters may further include historical knowledge 906, which may include knowledge from previous scenes and from transition between the previous scene and the current scene 902. The parameters may further include relationships 908, which determine relations between AI characters 910, 920, and 922. Each of the AI characters 910, 920, and 922 may have contextual knowledge 912, i.e., scene-specific knowledge. Each of the AI characters 910, 920, and 922 may further have a goal set 914. The goal set 914 may include a plurality of goals 916. Each of the goals 916 may be associated with a plurality of actions 918 to be taken by the AI character to pursue the goals 916.

In an example embodiment, scene 902 is a scene in which the AI character 910 is Indiana Jones who enters a cave (scene and location knowledge 904). The context is as follows: the AI character 910 knows that he is scared of snakes (contextual knowledge 912), but he is running away from enemies (contextual knowledge 912) and the AI character 910 now has the first goal 916 to run through the cave and escape the snakes. Therefore, the AI character 910 has actions 918 available to pursue the goal 916. The actions 918 may include running, asking for help, and the like. The next goal 916 of the AI character 910 may be to find the buried treasure. The last goal 916 may be to escape. For each of those goals 916, the AI character 910 has specific actions 918 that are available for the AI character 910 to pursue.

Figure 10:
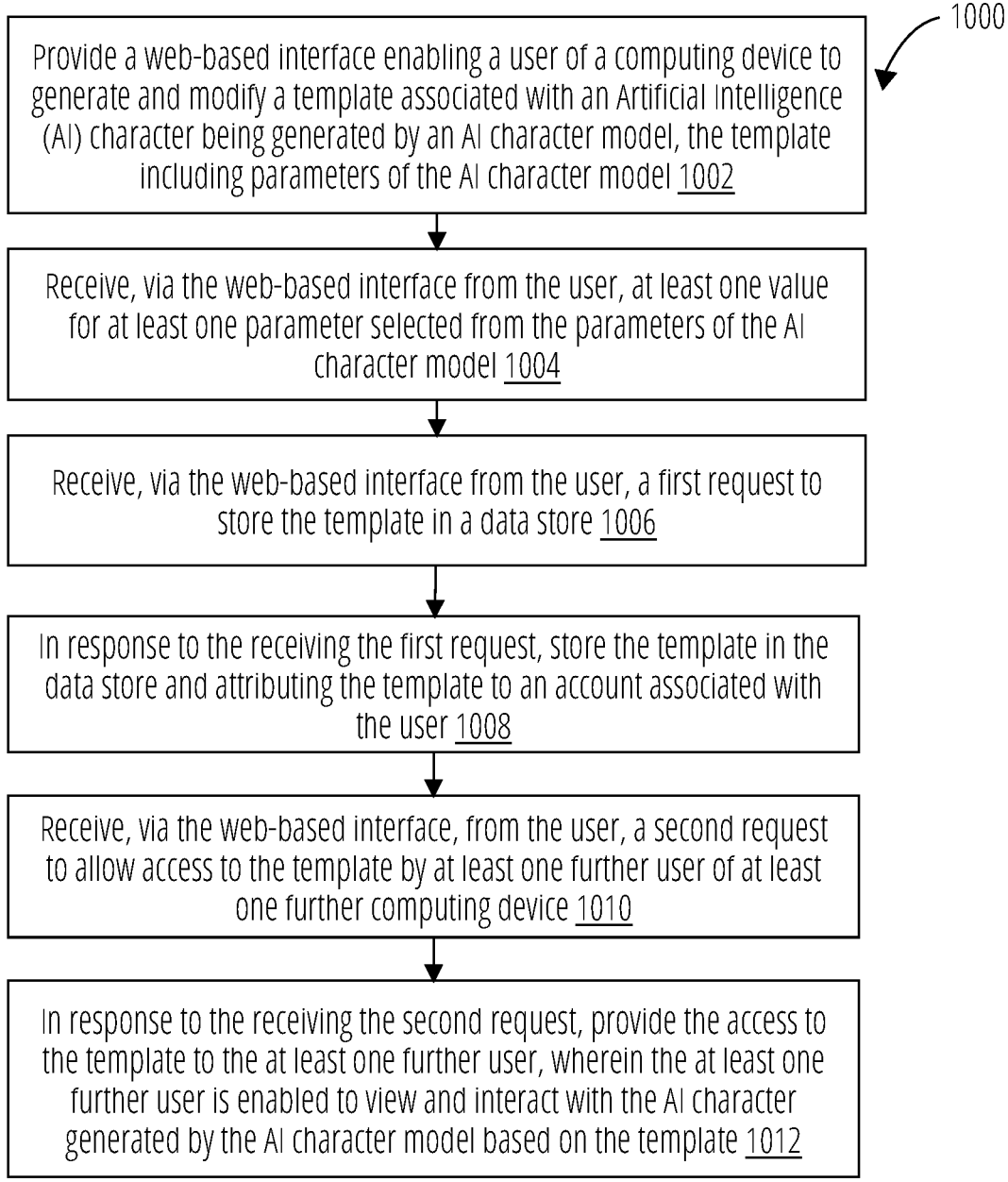
FIG. 10 illustrates a method for providing a network for generating, sharing, and viewing AI characters, in accordance with an example embodiment.

FIG. 10 is a flow chart of a method 1000 for providing a network for generating, sharing, and viewing AI characters, according to an example embodiment. Method 1000 can be implemented in environment 100 shown in FIG. 1. In some embodiments, the operations may be combined, performed in parallel, or performed in a different order. The method 1000 may also include additional or fewer operations than those illustrated. The method 1000 may be performed by processing logic that comprises hardware (e.g., decision making logic, dedicated logic, programmable logic, and microcode), software (such as software run on a general-purpose computer system or a dedicated machine), or a combination of both.

The method 1000 may commence in block 1002 with providing, by at least one processor, a web-based interface enabling a user (shown as a user 104 in FIG. 1) of a computing device (shown as a client-side computing device 102 in FIG. 1) to generate and modify a template associated with an AI character. The AI character may be generated by an AI character model. The template may include parameters of the AI character model.

In block 1004, the method 1000 may proceed with receiving, by the at least one processor, at least one value for at least one parameter selected from the parameters of the AI character model. The at least one value may be received from the user via the web-based interface.

The method 1000 may proceed in block 1006 with receiving, by the at least one processor, a first request to store the template in a data store. The first request may be received from the user via the web-based interface. In block 1008, the method 1000 may include storing, in response to the receiving the first request, the template in the data store and attributing the template to an account associated with the user.

The method 1000 may proceed in block 1010 with receiving, by the at least one processor, a second request to allow access to the template by at least one further user (shown as a further user 114 in FIG. 1) of at least one further computing device (shown as a client-side computing device 116 in FIG. 1). The second request may be received from the user via the web-based interface. In response to the receiving the second request, the at least one processor may provide, in block 1012, the access to the template to the at least one further user. The at least one further user may be enabled to view and interact with the AI character generated by the AI character model based on the template.

In an example embodiment, the method 1000 may further include receiving a verbal input from the at least one further user. Upon receiving the verbal input, the AI character model may be caused to generate a response of the AI character to the verbal input. The response of the AI character may be provided to the at least one further user.

In an example embodiment, the method 1000 may further include receiving comments with regard to the AI character from the at least one further user. Upon receiving the comments, the comments may be posted on a webpage displaying the AI character.

In an example embodiment, the method 1000 may further include receiving one or more keywords from the user. Upon receiving the one or more keywords, the method 1000 may proceed with selecting, based on the one or more keywords, a specific AI character in the data store. Upon selection of the specific AI character, a webpage featuring the specific AI character may be displayed. The one or more keywords may include one or more of the following: a name associated with the specific AI character, a role associated with the specific AI character, a behavioral characteristic of the specific AI character, a name of a virtual world associated with the specific AI character, a name of a scene in the virtual world, a name of an account of the user, a name of an account of a user that generated templates for the specific AI character, and so forth. The account may be configured to generate templates for the specific AI character. This embodiment may be used for providing, via the web-based interface, an option allowing the user to search, based on one or more keywords, for a specific AI character in the data store.

In an example embodiment, the method 1000 may further include receiving a third request to disallow the at least one further user to interact with the AI character. The third request may be received from the user via the web-based interface. In response to receiving the third request, one or more parameters of the AI character model may be adjusted, thereby disallowing the AI character to react to an input from the at least one further user.

In an example embodiment, the method 1000 may further include receiving a third request to restrict at least one feature of the AI character in interactions with the at least one further user. The third request may be received from the user via the web-based interface. In response to receiving the third request, one or more parameters of the AI character model may be adjusted, thereby disallowing the AI character to reveal the at least one feature in the interactions with the at least one further user. The restriction of the at least one feature of the AI character may include one or more of the following: limiting a scope of information of the AI character, limiting a number of facial expressions of the AI character, limiting a number of gestures of the AI character, limiting a vocabulary of the AI character, and so forth.

In an example embodiment, the method 1000 may further include receiving a third request to allow the at least one further user to modify the template. The third request may be received from the user via the web-based interface. In response to receiving the third request, an option enabling the at least one further user to modify the template may be provided via the web-based interface.

In an example embodiment, the method 1000 may further include receiving a third request to allow the at least one further user to copy the template. The third request may be received from the user via the web-based interface. In response to receiving the third request, an option enabling the at least one further user to copy the template to an account associated with the at least one further user may be provided via the web-based interface to the at least one further user.

Thus, the method 1000 enables creating a network of virtual characters in a form of an online portal/consumer platform and a web-based interface associated with the online portal/consumer platform. The web-based interface enables a user to generate, share, and comment on AI characters and view, interact with, and modify AI characters created by other users. The method 1000 may provide the online platform for uploading AI characters that are viewable by and shareable with other users. The user may open the online platform of AI characters, see a list of AI characters created by other users, and select one of the AI characters. Upon selection of the AI character, the user may start interaction with the AI character, film (i.e., record) the interaction, and re-share the recorded interaction with the AI character with other users. The user may also share the modified AI character that was created based on the interaction of the user with the AI character.

Figure 11:
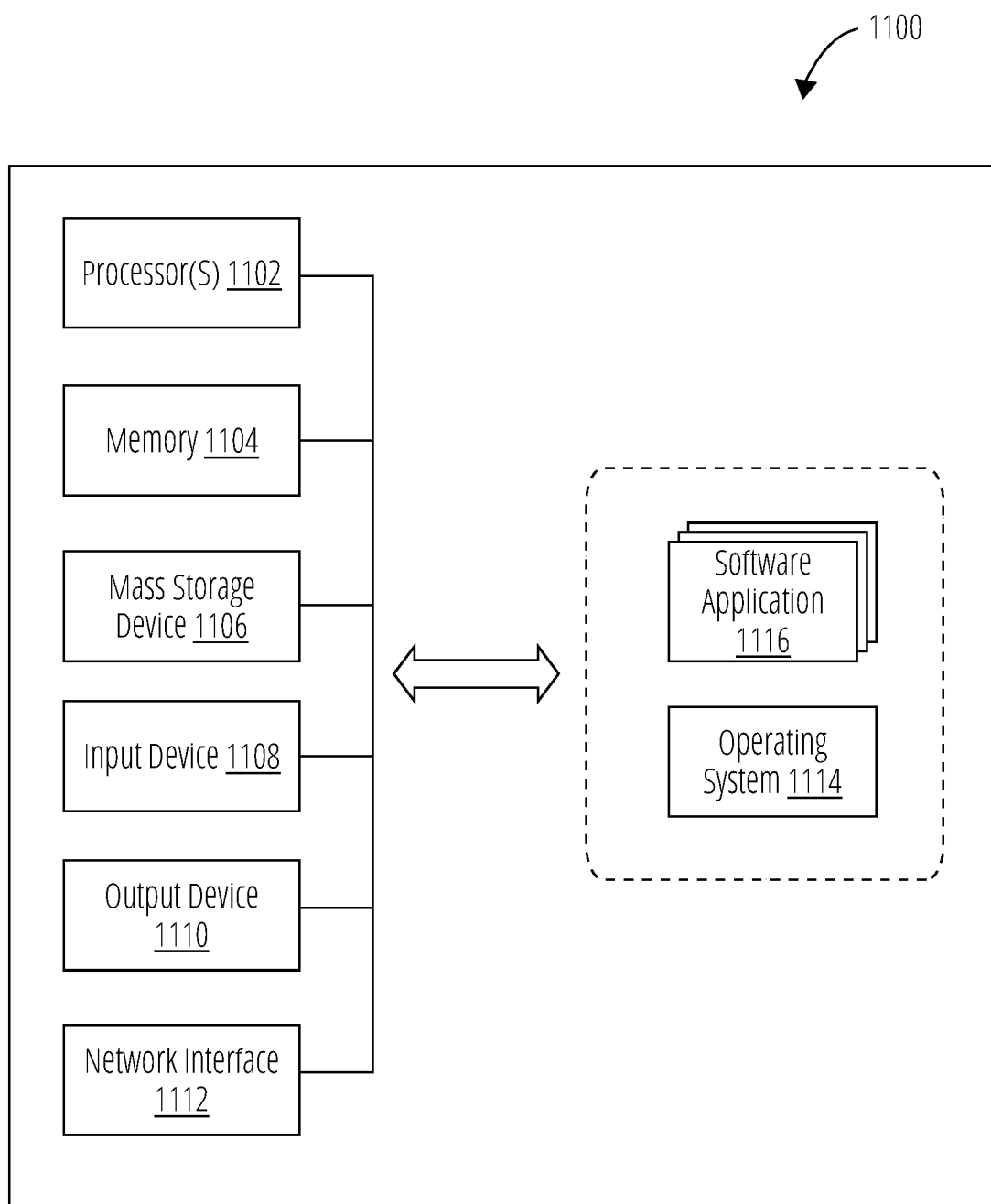
FIG. 11 is a high-level block diagram illustrating an example computer system, within which a set of instructions for causing the machine to perform any one or more of the methodologies discussed herein can be executed.

FIG. 11 is a high-level block diagram illustrating an example computer system 1100, within which a set of instructions for causing the machine to perform any one or more of the methodologies discussed herein can be executed. The computer system 1100 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. Notably, FIG. 11 illustrates just one example of the computer system 1100 and, in some embodiments, the computer system 1100 may have fewer elements/modules than shown in FIG. 11 or more elements/modules than shown in FIG. 11.

The computer system 1100 may include one or more processor(s) 1102, a memory 1104, one or more mass storage devices 1106, one or more input devices 1108, one or more output devices 1110, and a network interface 1112. The processor(s) 1102 are, in some examples, configured to implement functionality and/or process instructions for execution within the computer system 1100. For example, the processor(s) 1102 may process instructions stored in the memory 1104 and/or instructions stored on the mass storage devices 1106. Such instructions may include components of an operating system 1114 or software applications 1116. The software applications may include the studio 202, the integration interface 204, and the AI character model 300. The computer system 1100 may also include one or more additional components not shown in FIG. 11, such as a housing, a power supply, a battery, a global positioning system (GPS) receiver, and so forth.

The memory 1104, according to one example, is configured to store information within the computer system 1100 during operation. The memory 1104, in some example embodiments, may refer to a non-transitory computer-readable storage medium or a computer-readable storage device. In some examples, the memory 1104 is a temporary memory, meaning that a primary purpose of the memory 1104 may not be long-term storage. The memory 1104 may also refer to a volatile memory, meaning that the memory 1104 does not maintain stored contents when the memory 1104 is not receiving power. Examples of volatile memories include random access memories (RAM), dynamic random access memories (DRAM), static random access memories (SRAM), and other forms of volatile memories known in the art. In some examples, the memory 1104 is used to store program instructions for execution by the processor(s) 1102. The memory 1104, in one example, is used by software (e.g., the operating system 1114 or the software applications 1116). Generally, the software applications 1116 refer to software applications suitable for implementing at least some operations of the methods for providing a network for generating, sharing, and viewing AI characters as described herein.

The mass storage devices 1106 may include one or more transitory or non-transitory computer-readable storage media and/or computer-readable storage devices. In some embodiments, the mass storage devices 1106 may be configured to store greater amounts of information than the memory 1104. The mass storage devices 1106 may further be configured for long-term storage of information. In some examples, the mass storage devices 1106 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 1108, in some examples, may be configured to receive input from a user through tactile, audio, video, or biometric channels. Examples of the input devices 1108 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1100, or components thereof.

The output devices 1110, in some examples, may be configured to provide output to a user through visual or auditory channels. The output devices 1110 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1110 may also include a touchscreen, a presence-sensitive display, or other input/output capable displays known in the art.

The network interface 1112 of the computer system 1100, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 1112 may be a network interface card, such as an Ethernet card, an optical transceiver, a radio frequency transceiver, or any other type of device that can send and receive information.

The operating system 1114 may control one or more functionalities of the computer system 1100 and/or components thereof. For example, the operating system 1114 may interact with the software applications 1116 and may facilitate one or more interactions between the software applications 1116 and components of the computer system 1100. As shown in FIG. 11, the operating system 1114 may interact with or be otherwise coupled to the software applications 1116 and components thereof. In some embodiments, the software applications 1116 may be included in the operating system 1114. In these and other examples, virtual modules, firmware, or software may be part of the software applications 1116.

Thus, systems and methods for providing a network for generating, sharing, and viewing AI characters have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
   providing, by at least one processor, a web-based interface enabling a user of a computing device to generate and modify a template associated with an Artificial Intelligence (AI) character being generated by an AI character model, the template including parameters of the AI character model;
   receiving, by the at least one processor, via the web-based interface from the user, at least one value for at least one parameter selected from the parameters of the AI character model;
   receiving, by the at least one processor, via the web-based interface from the user, a first request to store the template in a data store;
   in response to the receiving the first request, storing, by the at least one processor, the template in the data store and attributing the template to an account associated with the user;
   receiving, by the at least one processor, via the web-based interface, from the user, a second request to allow access to the template by at least one further user of at least one further computing device;
   in response to the receiving the second request, providing, by the at least one processor, the access to the template to the at least one further user, wherein the at least one further user is enabled to view and interact with the AI character generated by the AI character model based on the template;
   receiving, via the web-based interface from the user, a third request to restrict at least one feature of the AI character in interactions with the at least one further user; and
   in response to receiving the third request, adjusting one or more parameters of the AI character model, thereby disallowing the AI character to reveal the at least one feature in the interactions with the at least one further user.

2. The method of claim 1, further comprising:
   receiving, from the at least one further user, a verbal input;
   causing the AI character model to generate a response of the AI character to the verbal input; and
   providing the response of the AI character to the at least one further user.

3. The method of claim 1, further comprising:
   receiving, from the at least one further user, comments with regard to the AI character; and
   posting the comments on a webpage displaying the AI character.

4. The method of claim 1, further comprising:
   receiving, from the user, one or more keywords;
   selecting, based on the one or more keywords, a specific AI character in the data store; and
   displaying a webpage featuring the specific AI character.

5. The method of claim 4, wherein the one or more keywords include one or more of the following: a name associated with the specific AI character, a role associated with the specific AI character, a behavioral characteristic of the specific AI character, a name of a virtual world associated with the specific AI character, a name of a scene in the virtual world, and a name of an account of the user, the account being configured to generate templates for the specific AI character.

6. The method of claim 1, further comprising:
   receiving, via the web-based interface from the user, a fourth request to disallow the at least one further user to interact with the AI character; and
   in response to the receiving the fourth request, adjusting the one or more parameters of the AI character model, thereby disallowing the AI character to react to an input from the at least one further user.

7. The method of claim 1, wherein the restricting the at least one feature of the AI character includes one or more of the following: limiting a scope of information of the AI character, limiting a number of facial expressions of the AI character, limiting a number of gestures of the AI character, and limiting a vocabulary of the AI character.

8. The method of claim 1, further comprising:
   receiving, via the web-based interface from the user, a fourth request to allow the at least one further user to modify the template; and
   in response to receiving the fourth request, providing, via the web-based interface, an option enabling the at least one further user to modify the template.

9. The method of claim 1, further comprising:
   receiving, via the web-based interface from the user, a fourth request to allow the at least one further user to copy the template; and
   in response to receiving the fourth request, providing, via the web-based interface, an option enabling the at least one further user to copy the template to an account associated with the at least one further user.

10. A computing system comprising:
    a processor; and
    a memory storing instructions that, when executed by the processor, configure the computing system to:

provide a web-based interface enabling a user of a computing device to generate and modify a template associated with an Artificial Intelligence (AI) character being generated by an AI character model, the template including parameters of the AI character model;

receive, via the web-based interface from the user, at least one value for at least one parameter selected from the parameters of the AI character model;

receive, via the web-based interface from the user, a first request to store the template in a data store;

in response to the receiving the first request, store the template in the data store and attribute the template to an account associated with the user;

receive, via the web-based interface, from the user, a second request to allow access to the template by at least one further user of at least one further computing device;

in response to the receiving the second request, provide the access to the template to the at least one further user, wherein the at least one further user is enabled to view and interact with the AI character generated by the AI character model based on the template;

receive, via the web-based interface from the user, a third request to restrict at least one feature of the AI character in interactions with the at least one further user; and in response to receiving the third request, adjust one or more parameters of the AI character model, thereby disallowing the AI character to reveal the at least one feature in the interactions with the at least one further user.

11. The computing system of claim 10, wherein the instructions further configure the computing system to:
receive, from the at least one further user, a verbal input;
cause the AI character model to generate a response of the AI character to the verbal input; and
provide, the response of the AI character to the at least one further user.

12. The computing system of claim 10, wherein the instructions further configure the computing system to:
receive, from the at least one further user, comments with regard to the AI character; and
post the comments on a webpage displaying the AI character.

13. The computing system of claim 10, wherein the instructions further configure the computing system to:
receive, from the user, one or more keywords;
select, based on the one or more keywords, a specific AI character in the data store; and
display a webpage featuring the specific AI character.

14. The computing system of claim 13, wherein the one or more keywords include one or more of the following: a name associated with the specific AI character, a role associated with the specific AI character, a behavioral characteristic of the specific AI character, a name of a virtual world associated with the specific AI character, a name of a scene in the virtual world, and a name of an account of the user, the account being configured to generate templates for the specific AI character.

15. The computing system of claim 10, wherein the instructions further configure the computing system to:
receive, via the web-based interface from the user, a fourth request to disallow the at least one further user to interact with the AI character; and
in response to the receiving the fourth request, adjust the one or more parameters of the AI character model, thereby disallowing the AI character to react to an input from the at least one further user.

16. The computing system of claim 10, wherein the restricting the at least one feature of the AI character includes one or more of the following: limiting a scope of information of the AI character, limiting a number of facial expressions of the AI character, limiting a number of gestures of the AI character, and limiting a vocabulary of the AI character.

17. The computing system of claim 10, wherein the instructions further configure the computing system to:
receive, via the web-based interface from the user, a fourth request to allow the at least one further user to modify the template; and
in response to receiving the fourth request, provide, via the web-based interface, an option enabling the at least one further user to modify the template.

18. A non-transitory computer-readable storage medium, the computer-readable storage medium including instructions that, when executed by a computing system, cause the computing system to:
provide a web-based interface enabling a user of a computing device to generate and modify a template associated with an Artificial Intelligence (AI) character being generated by an AI character model, the template including parameters of the AI character model;

receive, via the web-based interface from the user, at least one value for at least one parameter selected from the parameters of the AI character model;

receive, via the web-based interface from the user, a first request to store the template in a data store;

in response to the receiving the first request, store the template in the data store and attribute the template to an account associated with the user;

receive, via the web-based interface, from the user, a second request to allow access to the template by at least one further user of at least one further computing device;

in response to the receiving the second request, provide the access to the template to the at least one further user, wherein the at least one further user is enabled to view and interact with the AI character generated by the AI character model based on the template;

receive, via the web-based interface from the user, a third request to restrict at least one feature of the AI character in interactions with the at least one further user; and in response to receiving the third request, adjust one or more parameters of the AI character model, thereby disallowing the AI character to reveal the at least one feature in the interactions with the at least one further user.

* * * * *